Nov. 4, 1969  R. I. VAN NICE  3,477,052
HIGH SERIES CAPACITANCE WINDING FOR ELECTRICAL
INDUCTIVE APPARATUS
Filed Nov. 30, 1967  2 Sheets-Sheet 1
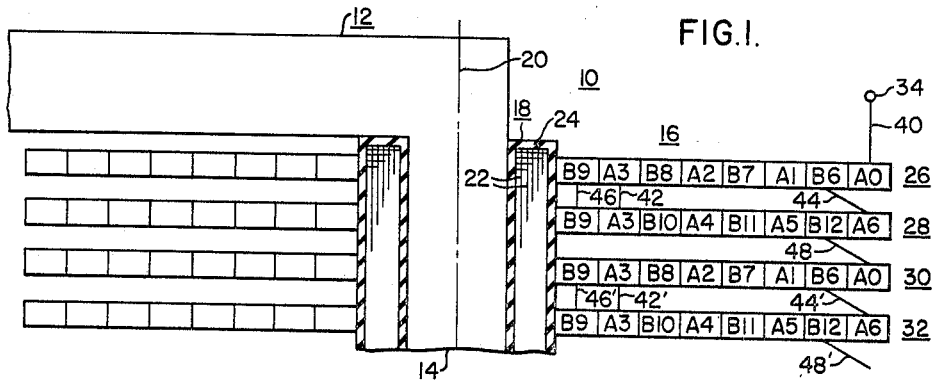
FIG.1.
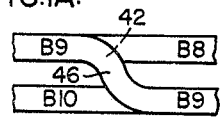
FIG.1A.
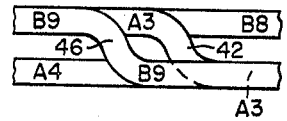
FIG.1B.
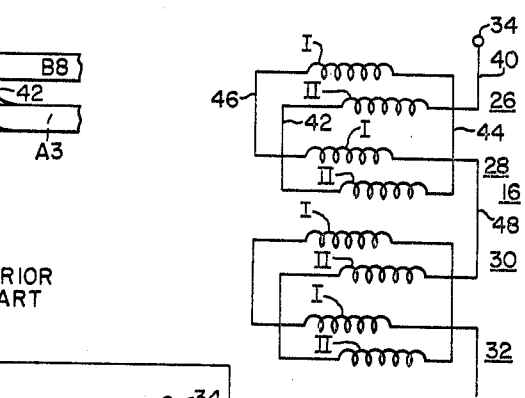
FIG.1C.
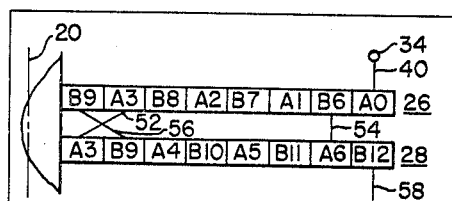
FIG.2. PRIOR ART
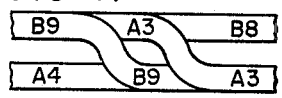
FIG.2A.
FIG.2B.
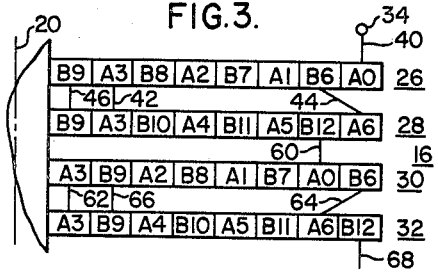
FIG.3.
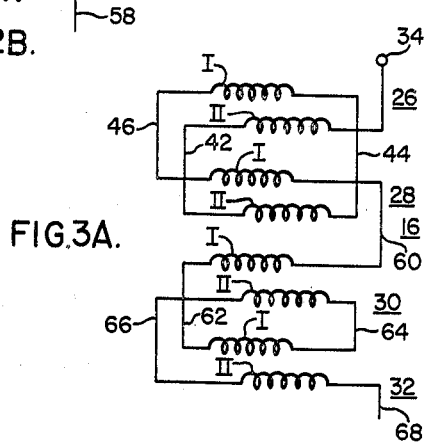
FIG.3A.
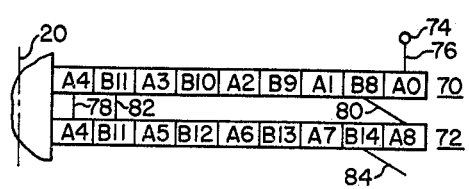
FIG.4.
INVENTOR
Robert I. Van Nice
BY Donald R. Lackey
ATTORNEY

United States Patent Office 3,477,052
Patented Nov. 4, 1969

3,477,052
HIGH SERIES CAPACITANCE WINDING FOR ELECTRICAL INDUCTIVE APPARATUS
Robert I. Van Nice, Sharon, Pa., assignor to Westinghouse Electric Corporation, Pittsburgh, Pa., a corporation of Pennsylvania
Filed Nov. 30, 1967, Ser. No. 686,912
Int. Cl. H01f 15/14
U.S. Cl. 336—70
8 Claims

ABSTRACT OF THE DISCLOSURE

A winding for electrical inductive apparatus which includes a plurality of pancake type coils arranged in a stack. Each pancake coil has first and second sections, the turns of which are radially interleaved. The sections of the pancake coils are interconnected to provide a plurality of pairs of adjacent first and second pancake coils, wherein a single series circuit successively traverses like sections of the first and second coils of each pair, and then returns to the first coil of the pair and successively traverses the like remaining sections of the first and second coils of the pair. The plurality of pairs are interconnected to provide a high series capacitance winding having a single series circuit between the ends of the winding.

BACKGROUND OF THE INVENTION

Field of the invention

The invention relates in general to electrical inductive apparatus, such as transformers, and more particularly to windings for such apparatus which utilize a plurality of pancake coils arranged in a stack and connected to increase the through or series capacitance of the winding.

Description of the prior art

Electrical inductive apparatus, such as single and polyphase electrical power transformers of the core-form type, commonly utilize a high voltage phase winding which includes a plurality of electrically connected pancake or disc type coils arranged in an axially aligned stack about a winding leg of a magnetic core. A surge potential, such as caused by lightning or switching, applied to the line terminal of a winding of this type, distributes itself across the turns of the pancake coils, across the winding, and from the winding to ground according to the capacitive structure of the winding, with the conductors and ground being the "electrodes" of the capacitors, and the winding insulation, and other insulating members, providing the dielectric. It is characteristic of the pancake coil type winding for a surge potential to concentrate at the line end of the winding, and rapidly attenuate as it enters the winding. It is desirable to distribute such surges as uniformly as possible across the turns of the pancake coils, and across the pancake coils of the winding, in order to prevent the stress from building up to undesirably high values, which may cause the stressed insulation to fail. Further, it is desirable to uniformly distribute surge potentials in order to reduce the magnitude of transient voltage oscillations produced when the voltage distribution changes from capacitive to inductive. The more nearly the capacitive voltage distribution conforms to the inductive distribution, the lower the magnitude of transient voltage oscillations produced as the distribution changes from capacitive to inductive.

An indication of how uniformly a surge potential will be distributed across a winding may be obtained from the distribution constant alpha of the winding. The distribution constant alpha is equal to the square root of the ratio of the capacitance $C_g$ of the winding to ground to the through or series capacitance $C_s$ of the winding.

$$\left(\alpha = \sqrt{\frac{C_g}{C_s}}\right)$$

The smaller the distribution constant alpha, the more uniformly a surge voltage will be distributed across the winding. Since the distribution constant alpha may be reduced by increasing the series capacitance of the winding, it is common in the prior art to form the pancake coils by simultaneously winding two or more conductors to form a plurality of coil sections, the turns of which are radially interleaved. Then, by connecting the sections of the pancake coils to mechanically locate turns from an electrically distant part of the coil or winding, between electrically connected turns, called interleaving, the voltage between physically adjacent coils is increased and adjacent turns are effectively connected in parallel, which increases the through or series capacitance of each pancake coil, and of the electrical winding.

Many different interleaving arrangements are used in the prior art, some of which are necessary in order to achieve different degrees of interleaving, and thus different values of series capacitance as required by specific applications, or in different sections of a single winding, and others which are necessary in order to achieve interleaved type windings while utilizing two or more electrical conductors which are connected in parallel with one another, in order to increase the current carrying capacity of the winding.

Some of the prior art interleaving arrangements are more economical to manufacture than others, depending, for example, upon the physical location of the interleaving and intercoil connections, and upon the configuration of the insulating members required to electrically insulate such connections. Thus, for any specific application, everything else being equal, the most economical interleaved winding will be chosen for a specific application.

One particularly attractive interleaving arrangement, from a manufacturing and cost viewpoint, for windings having a single series circuit between the ends or terminals of the winding, is the twin interleaving arrangement. Twin interleaved windings are those which require two adjacent pancake coils to complete the basic interleaving pattern. This type of prior art winding, however, has been found to produce voltage oscillations upon steep front surge testing, which greatly increases the stress between adjacent pancake coils near the mid-point of their builds. The steep wave front tests cause oscillations which continue after the applied wave is ended, continuing until dissipated in the resistance of the conductors and dielectric losses. These oscillations are not explained by the prior art theories using the distribution constant of the winding, as they are produced even when the capacitive surge voltage distribution is substantially the same as the inductive or steady state voltage distribution. Thus, in certain applications, in order to insure the passing of the surge tests more costly interleaving arrangements have been resorted to, which do not have these oscillations. It would, therefore, be desirable to reduce the stresses between adjacent pancake coils of a winding which utilizes twin interleaving, which would then make its use acceptable on more applications and enable the manufacturing cost of the windings in these applications to be reduced.

SUMMARY OF THE INVENTION

Briefly, the present invention is a new and improved twin interleaved winding arrangement which substantially reduces the stress between adjacent pancake coils when subjected to surge testing. In twin interleaved winding arrangements, each pancake coil includes first and second radially interleaved coil sections formed by simultaneously spirally winding first and second electrical conductors together. The pancake coils of the winding are connected in pairs of first and second adjacent pancake coils, to provide a single series circuit through each pair. The adjacent pancake coils of successively adjacent pairs are interconnected to provide a single series circuit through the winding.

In the twin interleaving arrangement, the series circuit through each pair of first and second adjacent pancake coils successively proceeds through the first, the second, the first and the second coils. In other words, the series circuit makes two passes through the first and second pancake coils, respectively, of each pair of coils. In the prior art, this is accomplished by successively proceeding through the first pancake coil via its first coil section, through the second pancake coil via its second coil section, through the first pancake coil via its second coil section, and through the second pancake coil via its first coil section. This interchanging of sections from coil to coil within the pair was probably prompted by the tendency to produce a transposition. When pancake coils have more than one coil section, and the coil sections are connected in parallel with one another at the ends of the complete winding structure, it is desirable to transpose the parallel circuits by making each circuit successively occupy each of the coil sections as the circuit proceeds from one pancake coil to the next across the winding, in order to subject each parallel circuit to the same net leakage flux and thus develop the same voltages in each circuit. This minimizes voltage unbalances which cause circulating currents in the parallel connected strands, and therefore reduces the losses of the winding.

In the twin interleaved winding, while each pancake coil has two coil sections, the coil sections are eventually connected in series with one another and not in parallel. There is only one series path between the terminals at the start and finish of the winding. Thus, a transposition of the winding sections is not only not required, it is not possible to obtain. The prior art teachings of changing sections as the circuit proceeds between the two pancake coils of a basic twin interleaving arrangement will, therefore, be referred to as interchanging, instead of a transposition.

Further, not only is the interchanging of sections in the basic twin interleaved pattern not necessary, it has been found to be the cause of the high voltage stresses produced between adjacent pancake coils of the winding, when a steep wave front impulse voltage, or a chopped wave voltage is applied to the line terminal of the winding. By interconnecting like coil sections of adjacent pancake coils, in the two pancake coils, of the basic twin interleaved arrangement the stress between the build mid-points of adjacent pancake coils is substantially reduced, well below the maximum allowable for the successful passing of these surge tests. This result is not predictable, nor is it explainable, by the capacitive structure of the coils and windings. Thus, the prior art theories on voltage distribution do not provide a complete understanding, at least in certain instances, of the factors which influence the behavior of a winding subjected to a surge potential.

BRIEF DESCRIPTION OF THE DRAWINGS

Further advantages of the invention will become more apparent when considered in view of the following detailed description and drawings, in which:

FIGURE 1 is a partial sectional elevation of a magnetic core and high and low voltage windings of a transformer embodying the teachings of the invention;

FIGS. 1A and 1B are diagrams which illustrate arrangements for the connections at the inside of the high voltage winding shown in FIG. 1;

FIG. 1C is a schematic representation of the high voltage winding shown in FIG. 1;

FIGS. 2 and 2A are diagrammatic views illustrating a winding constructed according to the teachings of the prior art, and the arrangement of the connections at the inside of the winding, respectively;

FIG. 2B is a schematic representation of the winding shown in FIG. 2;

FIG. 3 is a diagrammatic view of a winding constructed according to another embodiment of the invention;

FIG. 3A is a schematic representation of the winding shown in FIG. 3;

FIG. 4 is a diagrammatic view of a winding constructed according to still another embodiment of the invention;

DESCRIPTION OF THE PREFERRED EMBODIMENTS

Figure 5:
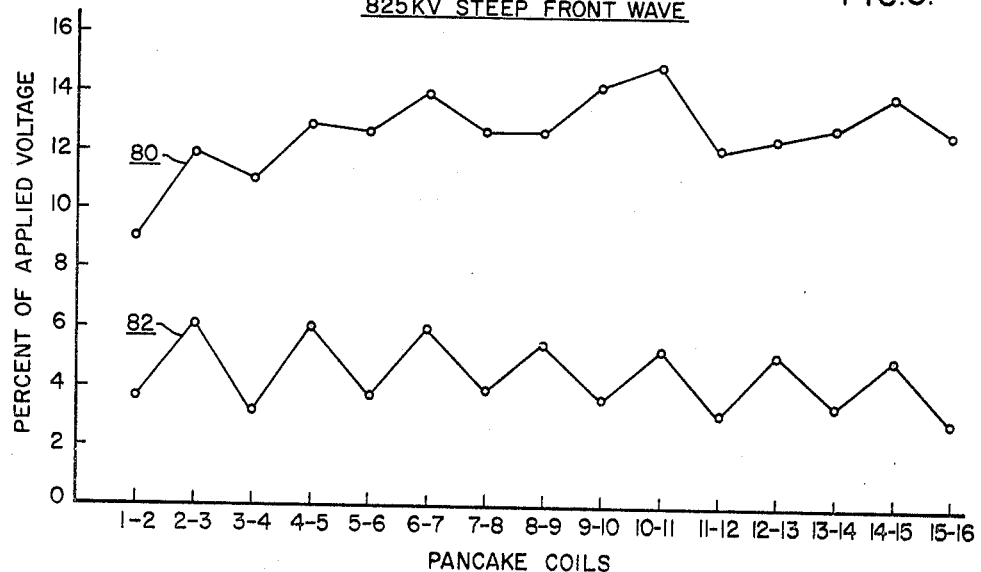
FIG. 5 is a graph which plots the stress between pancake coils produced by steep wave front surge testing, for windings constructed according to the teachings of the prior art, and windings constructed according to the teachings of the invention.

Referring now to the drawings, and FIG. 1 in particular, there is shown a partial sectional elevation of a transformer 10, which embodies the teachings of the invention. Transformer 10 is a power transformer of the core-form type, and it may be either single or polyphase. Since each phase of the transformer would be similar, in the event it is polyphase, only one phase is shown in FIG. 1 in order to simplify the drawing.

Transformer 10 includes a magnetic core 12, which may be of conventional construction, including a winding leg 14 having an axis 20 about which high and low voltage windings 16 and 18, respectively, are concentrically disposed. Low voltage winding 18, which may be of conventional construction, has a plurality of conductor turns 22 insulated from the magnetic core 12 and high voltage winding 16 by electrical insulating means 24.

High voltage winding 16 includes a plurality of pancake or disc type coils 26, 28, 30 and 32, which are spaced axially apart in a stacked arrangement about the axis 20 of the magnetic core leg 14. Only a sufficient number of pancake coils, and turns per pancake coil are shown in FIG. 1, and in the remaining figures, in order to adequately illustrate the invention. It is to be understood that the winding may have any desired number of pancake coils, and turns per pancake coil.

The plurality of pancake coils of winding 16 are constructed and connected to provide a high series capacitance winding, having a single series circuit between line terminal 34 at the start of the winding 16, and a terminal at the finish of the winding (not shown), which may be a line or a neutral terminal, depending upon the specific construction and application of the transformer 10.

Each of the pancake coils 26, 28, 30 and 32 have a plurality of conductor turns formed of at least first and second electrical conductors or strands spirally wound together about a common axis 20, to provide first and second coil sections I and II, respectively, each having inner and outer ends, the turns of which are radially interleaved with one another in substantially the same plane. The conductor turns are insulated from one another, in a manner well known in the art, with the insulation not being shown in order to clarify the drawings. Coil sections I and II are best illustrated in the schematic diagram of high voltage winding 16, shown in FIG. 1C. The two interleaved sections I and II of each pancake coil are shown slightly offset from one another in the schematic diagram of FIG. 1C, in order to more clearly denote the different radial locations of the two sections.

The pancake coils of high voltage winding 16 are connected in pairs, each having first and second adjacent pancake coils, to provide the basic interleaving arrangement. Since two pancake coils are required to complete the basic interleaving pattern, it is commonly called twin interleaving. Twin interleaving, according to the teachings of the invention, is performed by connecting the inner ends of like radial coil sections together in the first and second pancake coils of each pair, and by connecting the outer ends of different coil sections in the first and second pancake coils of each pair. More specifically, taking pancake coils 26 and 28 as the first and second pancake coils of an interleaved pair, respectively, the circuit would enter the outer end of section II of the first pancake coils 26 via conductor 40, which may be connected to the line terminal 34, it would then spiral inwardly via every other turn of pancake coil 26, it would leave the inner end of coil section II and proceed via conductor 42 to the inner end of coil section II of the second pancake coil 28, it would spiral outwardly via every other turn until reaching the outer end of section II, it would proceed to the outer end of section I of pancake coil 26 via conductor 44, it would spiral inwardly via every other turn through pancake coil 26, until reaching the inner end of this section, it would proceed from the inner end of section I of pancake coil 26 to the inner end of section I of pancake coil 28 via conductor 46, it would spiral outwardly through pancake coil 28 via every other turn, and the circuit would leave pancake coil 28 via conductor 48. Instead of proceeding through the second sections of the first and second pancake coils of the pair, and then through the first sections of the pancake coils, it would be equally suitable to reverse this sequence, first passing through the first coil sections of the first and second pancake coils, and then passing through the second coil sections of the first and second pancake coils, respectively.

Since the series circuit spirals inwardly in one pancake coil of the pair, and it spirals outwardly in the other pancake coil of the pair, the two pancake coils of each pair should be "wound" in opposite circumferential directions, in order to obtain a uniform direction of instantaneous current flow in the pancake coils of the winding. In practice, this is achieved by winding all pancake coils in the same circumferential direction, and then breaking down and rewinding by hand alternate coils, in order to achieve the desired result without severing the conductor, which would then require an additional welded or brazed joint between pancakes.

In this embodiment of the invention, the next pair of coils 30 and 32 will be interconnected in the same manner as the first pair of coils 26 and 28, with the same reference numerals plus a prime mark being used to indicate like components in pancake coils 30 and 32. Thus, each successive pair of pancake coils is connected to provide a series circuit which successively traverses the first, the second, the first and the second pancake coils of each pair, and adjacent pancake coils of adjacent pairs are interconnected to connect the series circuit of each pair in series circuit relation with the series circuits of the other pairs. This is accomplished by connecting the outer end of the first coil section of the second pancake coil of one pair, to the outer end of the second coil section of the first pancake coil of the adjacent pair, via conductor 48.

As shown in FIG. 1, the turns of the coil sections are numbered with letters A and B, to indicate whether the circuit is progressing through the pancake coil for the first or second time, respectively, followed by a number to indicate the number of the turn in the basic twin interleaved winding arrangement. Accordingly, the circuit enters pancake coil 26 at the end of the outer turn of section II, with the end of this turn being labeled A0, and the circuit spirals inwardly, appearing at the turns referenced A1, A2 and A3. At the end of the inner turn A3 of coil section II, the circuit proceeds to pancake coil 28 via conductor 42, entering the inner end of coil section II, which is also referenced A3 to indicate that the ends of the interconnected turns are at substantially the same potential. The circuit then spirals outwardly, appearing at turns A4, A5 and A6. At the end of turn A6, the circuit proceeds back to pancake coil 26 via conductor 44, entering the outer end of the first coil section I, with this outer end being referenced B6 to indicate the second excursion of the circuit through pancake coil 26, and also to indicate that the ends of the interconnected turns are at substantially the same potential. The circuit again spirals through pancake coil 26, appearing at turns B7, B8 and B9. At the end of turn B9, the circuit again proceeds to pancake coil 28, via conductor 46, entering the inner end of coil section I, which is referenced B9, and the circuit spirals outwardly appearing at turns B10, B11 and B12. The circuit continues to the outer end of section II of pancake coil 30, where the same twin interleaving pattern is repeated for pancake coils 30 and 32.

As shown in FIG. 1A, which illustrates the inside or "start-start" connections between pancake coils 26 and 28, the connections 42 and 46 may be circumferentially aligned with one another, and easily formed and insulated since they are at different radial locations. Or, as shown in FIG. 1B, the connections 42 and 46 may be spaced circumferentially from each other. In either embodiment, the interconnections do not exchange radial locations, as they do in the prior art.

The twin interleaved winding arrangement of the prior art is shown in FIGS. 2, 2A and 2B, with FIGS. 2 and 2A being diagrammatic views of a prior art winding and its connections at the inside of the winding, respectively, and FIG. 2B is a schematic representation of the winding shown in FIG. 2. Pancake coils 26 and 28 of FIG. 1 have been chosen to illustrate the connections of the prior art in FIG. 2. The circuit enters the outer end of coil section II of pancake coil 26 via conductor 40, which conductor may be connected to line terminal 34, and it spirals inwardly to the inner end of this section and then proceeds to pancake coil 28. However, instead of entering the same coil section in pancake coil 28, which it has just traversed in pancake coil 26, it enters the inner end of coil section I of pancake coil 28, via conductor 52, and the circuit spirals outwardly to the end of this section. The circuit then goes back to pancake coil 26 via conductor 54, entering the outer end of coil section I of pancake coil 26, it spirals inwardly to the inner end of this section, and then proceeds to pancake coil 28 via conductor 56, entering the inner end of coil section II. The circuit spirals outwardly through pancake coil 28 for the second time, and leaves pancake coil 28 via conductor 58, where it proceeds to the next interleaved pair, which is interleaved in the same manner just described for pancake coils 26 and 28. Thus, instead of first proceeding through the first and second pancake coils of the pair via similar or like coil sections, and then proceeding through the first and second pancake coils again via the remaining similar or like coil sections, as disclosed in FIG. 1, the coil sections are interchanged, proceeding through opposite coil sections of the two pancake coils on each excursion or path through them. As shown in FIG. 2A, which illustrates the inner connections between the pancake coils in FIG. 2, the connectors 52 and 56 exchange radial locations, and thus must be circumferentially shifted with respect to one another, and insulating members must be provided to prevent any abrasion of the insulation on the individual conductors or strands. In addition to facilitating the manufacture of the twin interleaved winding, by simplifying the connections between the inner turns of the coil sections of adjacent pancake coils of an interleaved pair, the teachings of the invention have further substantial benefits over the prior art arrangement, which will be hereinafter described.

In the embodiment of the invention shown in FIGS. 1 and 1C, each pair of pancake coils are wound and interconnected in exactly the same manner. In some instances, lower voltage stresses may be experienced between adjacent pancake coils of adjacent pairs, if an interchanging of coil sections is accomplished between successive pairs of coils. This is unlike the prior art, where interchanging of coil sections is performed between the pancake coils of the pair itself. Thus, instead of the circuit entering the second pair of pancake coils, in the same place as it first entered the first pair of pancake coils, the circuit would enter the same coil section in alternate pairs, and in the remaining pairs it would first enter the other or remaining coil section. This embodiment of the invention is shown in FIGS. 3 and 3A, where FIG. 3 is a diagrammatic representation of the same four pancake coils 26, 28, 30 and 32, shown in FIG. 1, but interconnected according to another embodiment of the invention, and FIG. 3A is a schematic representation of the winding shown in FIG. 3. Pancake coils 26 and 28 are connected the same as hereinbefore described relative to their connections in FIG. 1, proceeding first through coil sections II of pancake coils 26 and 28, and then through coil sections I. The next pair of pancake coils 30 and 32 are connected to direct the circuit first through coil sections I and then through coil sections II. Thus, when pancake coil 28 is completed, the circuit enters coil section I of pancake coil 30 via conductor 60, the inner end of coil section I of pancake coil 30 is connected to the inner end of coil section I of pancake coil 32, via conductor 62, the outer end of coil section I of pancake coil 32 is connected to the outer end of coil section II of pancake coil 30, via conductor 64, the inner end of coil section II of pancake coil 30 is connected to the inner end of coil section II of pancake coil 32 via conductor 66, and the outer end of coil section II proceeds to the next pancake coil via conductor 68, where the interleaving arrangement of pancake coils 26 and 28 would be repeated by the next successive pair of pancake coils.

In the embodiment of the invention shown in FIGS. 1 and 3, each coil section of each pancake coil was illustrated as having an even number of turns. This, however, is not essential to the invention. As shown in FIG. 4, the invention is applicable to pancake coils having a different number of turns in each of the coil sections of the pancake coil. For example, FIG. 4 illustrates two pancake coils 70 and 72, with one coil section of each pancake coil having four turns, and the other coil section having three turns.

The circuit enters the outer turn of the coil section having four turns, spirals inwardly to the inner end of this section, proceeds to the similar section in pancake coil 72 via conductor 78, spirals outwardly through this section, proceeds to the remaining section of pancake coil 70 via conductor 80, spirals inwardly to the inner end of this section, enters the inner end of the similar section of pancake coil 72 via conductor 82, and it spirals outwardly to the end of this section, where it leaves the coil via conductor 84 for connection to the next pair of coils. Like the embodiments shown in FIGS. 1 and 3, the next two pancake coils may be connected the same as coils 70 and 72; or, the circuit may proceed first through the sections having the fewer number of turns, and then through the sections having the greater number of turns.

In order to obtain a winding having an average odd number of turns per pancake coil, it would be practical to vary the number of turns from pair to pair, with the pancake coils in alternate pairs each having, for example, 36 turns, and the pancake coils in the remaining pairs each having 34 turns. Thus, the average number of turns per pancake coil would be 35 turns. Average fractional turns may be achieved by having an even number of turns in each coil of alternate pairs, and an odd number of turns in each coil of the remaining pairs.

The A and B notations were used in the figures to illustrate the first and second excursions, respectively, of the series circuit through a pancake coil, in order to more clearly illustrate the distinction between the prior art windings and those constructed according to the teachings of the invention. In the prior art windings shown in FIG. 2, the A and B sections are interchanged from pancake to pancake, while in the embodiments of the invention shown in FIGS. 1, 3 and 4, the A and B sections are in the same radial location in both pancake coils of a pair. However, according to the embodiment of the invention shown in FIG. 3, the location of the A and B sections may be interchanged from pair to pair, but within the pair they are same. The prior art arrangement, as hereinbefore stated, obtains an apparent "transposition," which is essential when the A and B sections are parallel connected. However, this interchange between pancake coils of an interleaved pair has been found to be the cause of excessive voltage oscillations between adjacent pancake coils, which occurs at substantially the mid-point of the radial builds of the pancake coils, upon surge testing.

Figure 6:
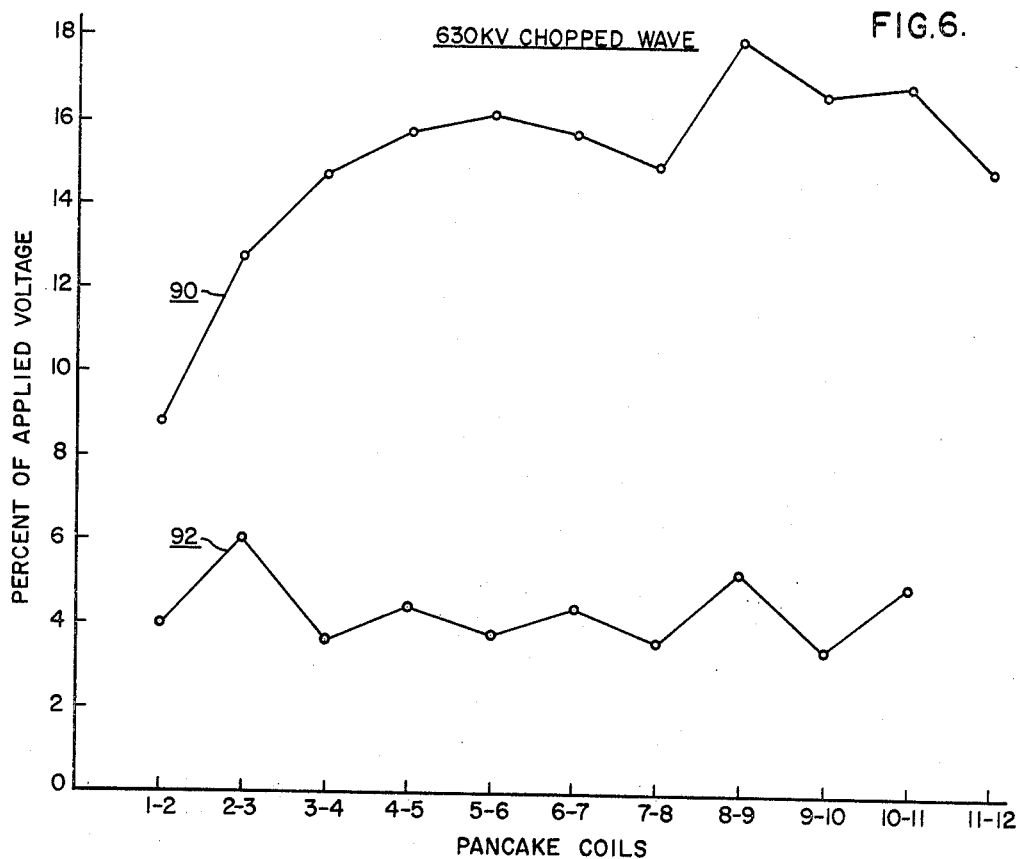
FIG. 6 is a graph which plots the stress between pancake coils produced by chopped wave surge testing, for windings constructed according to the teachings of the prior art, and windings constructed according to the teachings of the invention.

FIGS. 5 and 6 are graphs which compare the voltage stress produced between adjacent pancake coils of an electrical winding connected according to the teachings of the prior art, as shown in FIG. 2, and of an electrical winding connected according to the embodiment of the invention shown in FIG. 1, for an 825 kv. steep wave front test, and a 630 kv. chopped wave test, respectively. The pancake coils are numbered consecutively starting with pancake coil No. 1 which is connected to the line terminal, and the voltage stress is measured between each pancake coil and the adjoining pancake coils, at substantially the mid-point of their radial builds.

Curve 80 in FIG. 5 indicates the stress at the midpoint of the radial build between adjacent pancake coils constructed according to the teachings of the prior art, upon the application of an 825 kv. steep wave front impulse voltage applied to the line terminal of the winding. The minimum stress was 9% of the applied voltage, which occurred between pancake coils 1 and 2, and the maximum stress was 15% of the applied voltage, which appeared between pancake coils 10 and 11. The average voltage stress between pancake coils, measured at their mid-points of the radial build was approximately 12% of the applied voltage.

Reconnecting the same pancake coils used for gathering the data for curve 80, according to the teachings of the embodiment of the invention shown in FIG. 1, and applying the same 825 kv. steep wave front test to the reconnected winding, produced the results shown in curve 82 of FIG. 5. It will be observed that the minimum stress is approximately 4% of the applied voltage, and the maximum stress is approximately 6% of the applied voltage, with the average stress being approximately 5%. Thus, the embodiment of the invention shown in FIG. 1 produces a completely unexpected reduction in the maximum stress, from 15% of the applied voltage to 6%, and a reduction in the average stress from 12% to 5%, compared with prior art windings.

It will be noted that in curve 82, the stress between the pancake coils of an interleaved pair is about 4% of the applied voltage, while the stress between adjacent pancake coils of adjacent pairs is about 6%. This slighlty higher stress between the pairs may be reduced by interchanging the coil sections from pair to pair, as hereinbefore described relative to FIG. 3.

Curve 90 of FIG. 6 indicates the stress at the midpoint of the radial build between adjacent pancake coils constructed according to the teachings of the prior art, with a 630 kv. chopped wave impulse test. The minimum voltage stress was approximately 9% of the applied voltage, which occurred between pancake coils 1 and 2, and the maximum stress was 18% of the applied voltage, which occurred between pancake coils 8 and 9. Reconnecting the same pancake coils used for gathering the data for curve 90, according to the teachings of the embodiment of the invention shown in FIG. 1, and subjecting the winding to the same 630 kv. chopped wave impulse test, produced the results shown in curve 92 of FIG. 6. The minimum stress is below 4% of the applied voltage, while the maximum stress is approximately 6%. Thus, the results with the chopped wave are equally unexpected as they were with the steep wave front impulse test, also providing a remarkable reduction in the stresses between pancakes. Curve 92 may also be flattened somewhat by connecting the pancake coils as hereinbefore described relative to FIG. 3, wherein the coil sections are interchanged between adjacent pairs of coils across the winding.

In summary, there have been disclosed new and improved twin interleaved type winding structures for electrical transformers, which not only provide the high series capacitance of the prior art twin interleaved windings, but which substantially reduce the stress between adjacent pancake coils, at the mid-points of the radial build, upon step wave and chopped wave impulse voltages, compared with prior art twin interleaved windings. Thus, electrical windings constructed according to the teachings of the invention may be used in applications which, in the prior art, would require more costly interleaving arrangements. Further, the disclosed twin interleaved winding structures area easier to manufacture than the twin interleaved windings of the prior art, as the connections between the pancake coils of an interleaved pair at the inside of the winding structure do not exchange radial locations, as they do in the prior art structures.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense. For example, while the invention has been described with the winding starting at the outside of the winding, it applies equally to twin interleaved windings which start at the inside of the winding. In other words, in FIG. 1, the turns A0 and A6 would be adjacent low voltage winding 18, instead of turns B9, with the connections of the pancakes being otherwise as shown in FIG. 1.

I claim as my invention:

1. A winding for electrical inductive apparatus, comprising:
    a plurality of pancake coils arranged in a stack,
    each of said pancake coils having a plurality of turns of first and second conductors wound together to provide first and second radially interleaved coil sections, respectively, each having inner and outer ends, with all of the turns of the first and second sections between their inner and outer ends being interleaved with one another,
    first means interconnecting said pancake coils in a plurality of pairs of first and second adjacent pancake coils, said first means being electrical conductors disposed between the coils of each pair, which directly interconnect predetermined inner ends, and predetermined outer ends, of the two coils of each pair, to provide a single series circuit in each pair which successively includes a first pass through the first and second pancake coils of a pair, and then a second pass through the first and second pancake coils of the pair, successively, with the first pass being made through like coil sections of the pair, and the second pass being made through the like remaining coil sections of the pair,
    and second means interconnecting the adjacent pancake coils of successively adjacent pairs of pancake coils, to provide a single series circuit through the winding.

2. The winding of claim 1 wherein the first and second passes of the series circuit through the first and second pancake coils of each pair, respectively, utilize the same coil section sequence in each of the plurality of pairs.

3. The winding of claim 1 wherein the first and second passes of the series circuit through the first and second pancake coils of each pair, respectively, utilize the same coil section sequence in alternate pairs, and the reverse coil section sequence in the remaining pairs.

4. The winding of claim 1 wherein said first means, in each pair, interconnects the inner ends of the first coil sections, the inner ends of the second coil sections, and the outer ends of predetermined first and second coil sections, of said first and second pancake coils 5. The winding of claim 4 wherein the interconnected outer ends of the first and second coil sections are from the first and second pancake coils, respectively, and said second means interconnects the second and first coil sections of the second and first pancake coils, respectively, of adjacent pairs.

6. The winding of claim 4 wherein the interconnected outer ends of the first and second coil sections are from the second and first pancake coils, respectively, and said second means interconnects the second and first coil sections of the second and first pancake coils, respectively, of adjacent pairs.

7. The winding of claim 4 wherein the interconnected outer ends of the first and second coil sections are from the first and second pancake coils, respectively, in alternate pairs, and from the second and first pancake coils, respectively, in the remaining pairs, and said second means interconnects like coil sections of adjacent pancake coils of adjacent pairs, with the like connected sections being the first coil sections in alternate connections between pairs, and the second coil sections in the remaining connections between pairs.

8. The winding of claim 1 wherein the turns of the first and second pancake coils of each pair are wound in opposite circumferential directions, with said first and second means interconnecting said coil sections to provide the same circumferential direction of instantaneous current flow in each of the pancake coils of the winding.

References Cited

UNITED STATES PATENTS 3,090,022 5/1963 Stein _____ 336—70
3,405,378 10/1968 Martin _____ 336—70

LEWIS H. MYERS, Primary Examiner

T. J. KOZMA, Assistant Examiner